United States Patent [19]

Martin

[11] 4,213,943

[45] Jul. 22, 1980

[54] PRODUCTION OF ALUMINUM CHLORIDE FROM CLAY USING STAGED REACTORS

[75] Inventor: Edward S. Martin, Lower Burrell, Pa.

[73] Assignee: Aluminum Company of America, Pittsburgh, Pa.

[21] Appl. No.: 972,468

[22] Filed: Dec. 22, 1978

[51] Int. Cl.² .............................. C01F 7/56; C01F 7/58
[52] U.S. Cl. ..................................... 423/135; 423/136; 423/137; 423/343; 75/113
[58] Field of Search ............... 423/135, 136, 137, 341, 423/343, 495; 75/112, 113

[56] References Cited

U.S. PATENT DOCUMENTS

| | | | |
|---|---|---|---|
| 1,866,731 | 7/1932 | Slaib | 423/136 |
| 1,875,105 | 8/1932 | Muggleton et al. | 423/136 |
| 3,760,066 | 9/1973 | Calcagno et al. | 423/136 |
| 4,086,320 | 4/1978 | Martin et al. | 423/136 |
| 4,096,234 | 6/1978 | Martin et al. | 423/136 |

*Primary Examiner*—Herbert T. Carter
*Attorney, Agent, or Firm*—David W. Brownlee

[57] ABSTRACT

Aluminum chloride is produced from clay containing aluminum oxide and silicon oxide by chlorinating clay in at least two stages with a mixture consisting of a chlorinating agent, a reducing agent, an alkali metal compound catalyst and silicon tetrachloride in which the proportions and amounts of the feed gases to each stage are separately regulated to suit the needs of the aluminum chloride production reaction in that stage. The effluent gases from the successive stages are collected and the silicon tetrachloride is separated from such gases and recycled back into the reactors to promote chlorination of the aluminum oxide in the clay while suppressing net chlorination of the silicon oxide fraction of the clay.

8 Claims, 2 Drawing Figures

PRODUCTION OF ALUMINUM CHLORIDE FROM CLAY USING STAGED REACTORS

BACKGROUND OF THE INVENTION

This invention relates to the production of aluminum chloride from clay. More particularly, this invention relates to an improved system for chlorination of clays in multiple stages in which the proportions and amounts of the chlorinating agent, reducing agent, alkali metal compound catalyst and silicon tetrachloride can be separately regulated to each stage to suit the needs of the aluminum chloride production reaction in each stage.

U.S. Pat. Nos. 4,086,320 and 4,096,234 describe the production of aluminum chloride by chlorination of clay containing aluminum oxide and silicon oxide. The reducing agent in such chlorination is a gaseous agent such as carbon monoxide gas or phosgene ($COCl_2$), which can be used as both the reducing agent and the chlorinating agent. Chlorine gas can also be used as a chlorinating agent if carbon monoxide is used as the reducing agent. U.S. Pat. No. 4,096,234 further discloses the addition of a catalyst such as potassium aluminum chloride ($KAlCl_4$) and recycling silicon tetrachloride back to the reaction zone to enhance the yield of aluminum chloride from the aluminum oxide present in clay while reducing the amount of silicon tetrachloride produced in the chlorination reaction. U.S. Pat. No. 4,086,320 discloses that the clay should preferably be comminuted to a particle size range of 90% by weight smaller than 0.6 millimeter to provide maximum recovery of aluminum chloride from the clay.

It is also known to use solid reducing agents in the chlorination of aluminous materials to form aluminum chloride. For example, U.S. Pat. No. 3,760,066 to Calcagno et al teaches the production of aluminum trichloride by reacting alumina particles with chlorine gas in a fluidized bed containing alumina and carbon particles, preferably coke, at 800°-1000° C.

Raw materials useful in the chlorination process are those containing an aluminum compound particularly where the major impurity is a silicon compound. Kaolin clays (such as kaolinite) are particularly well suited for the chlorination process.

It is desirable to operate a reactor for chlorination of clay on a continuous basis with a continuous flow of solid reactants through the reactor and a continuous flow of gaseous aluminum chloride from the reactor. This means that solid clay particles must be continuously fed to and discharged from the reactor and that the reaction bed consist of clay particles in various stages of aluminum depletion. The degree of aluminum depletion will depend on the kinetics of the reaction involved and on the residence time of the clay in the reaction zone.

Operation of a single stage reactor with a continuous flow of clay through it will result in discharge of a considerable amount of unreacted alumina unless the feed and discharge rates are quite low. However, low feed and discharge rates result in a low rate of conversion of the aluminous material into aluminum chloride.

The conflict between high production rates and good total extraction can be overcome by a process known as staging in which the solids are caused to follow a circuitous path through the reactor. Staging can be accomplished in a variety of ways as disclosed in the *Chemical Engineer's Handbook* by Perry and Chilton (5th Ed. 1973), page 20-64. As disclosed in such Handbook, the two basic types of staging are vertical and horizontal.

Vertically staged reactors involve countercurrent flow of gases and solids, which can be troublesome, especially when operated at elevated temperatures to process corrosive materials. For example, vertically staged reactors sometimes suffer from corrosion of the grids between stages, plugging of the grids, pressure drops between stages, gas leaks, and material handling problems. On the other hand, conventional horizontally staged reactors typically feed the same gas through all the stages and therefore aren't amenable to regulation of gas flow into the various stages for most efficient operation.

SUMMARY OF THE INVENTION

This invention provides a method and apparatus for producing aluminum chloride from clay in which the clay is chlorinated in at least two stages by contacting the clay successively with gaseous mixtures comprising a chlorinating agent and silicon tetrachloride in which the mixture of the gases is separately controlled for each stage to suit the needs of the aluminum chloride production in that stage. Silicon tetrachloride is separated from the effluent gases produced by the reactor and is recycled back to the reaction stages in the proper proportions. The proportions of aluminum chloride and silicon tetrachloride in the effluent gases produced in each stage may be measured to determine appropriate adjustment for the concentration of silicon tetrachloride needed in the feed gas to avoid or minimize chlorination of the silicon oxide in each such stage.

An object of this invention is to provide a method and apparatus for chlorinating clay which permits the clay to be continuously fed through the apparatus and chlorinated at a maximum production rate with a minimum of capital expenditure.

A further object of this invention is to provide a system which permits adjustment of the gaseous mixture used in chlorination to provide maximum efficiency. As the alumina content in the clay is depleted as the clay moves from stage to stage, the ratio of silicon tetrachloride to the chlorinating agent can be separately adjusted for each stage to optimum conditions of chlorinating in each stage.

The above and other objects and advantages of this invention will be more fully understood and appreciated with reference to the following description and the drawings attached hereto.

DESCRIPTION OF PREFERRED EMBODIMENTS

In accordance with this invention, a staged reactor or reactors are employed to chlorinate aluminous material such as kaolin clay to produce aluminum chloride. In the preferred embodiments of the invention, the parameters disclosed in U.S. Pat. Nos. 4,086,320 and 4,096,234 are used. That is, an aluminous material source such as kaolin clay is used having a surface area preferably of at least 15 m$^2$/g and having a particle size (after drying and comminution) of 90% by weight less than 0.6 millimeter in diameter. The particles of aluminous material are chlorinated in a fluidizing bed using a reducing agent such as carbon monoxide and a chlorinating agent such as $Cl_2$ or $COCl_2$. In the case of phosgene ($COCl_2$), the reducing and chlorinating agents are combined. The clay is chlorinated in the presence of a catalyst which is an alkali metal compound. Preferred are alkali aluminum halides and most particularly preferred is potassium aluminum chloride ($KAlCl_4$) or sodium aluminum chloride ($NaAlCl_4$). Other possible alkali aluminum halides include rubidium aluminum chloride and lithium aluminum chloride. These catalysts may be formed in situ in the reactor by the addition to the reactor of an alkali metal halide such as, for example, sodium chloride, sodium bromide, potassium iodide, or the like.

The reducing agent in the reaction may be gaseous in the form of carbon monoxide or phosgene ($COCl_2$), or may be a solid reducing agent such as petroleum coke. An appropriate petroleum coke may be prepared by making use of the delayed coking process. The green coke coming from the delayed coking process is calcined to remove moisture and volatiles. The resulting calcined coke is appropriate for use in the present invention. The amount of coke used for chlorination of aluminous material such as kaolin clay may be 18% or more of the weight of the roasted clay, with 11.4–16% by weight preferred.

The chlorination reaction is carried out at a temperature of from about 550–650° C. and may involve a residence time of about 1½ to 2½ hours for the clay to pass through all stages of the reactor at one atmosphere of pressure, with more or less residence time required for other pressure levels. Following chlorination, the aluminum chloride is separated from the effluent gases by well-known techniques such as fractional distillation.

Figure 1:
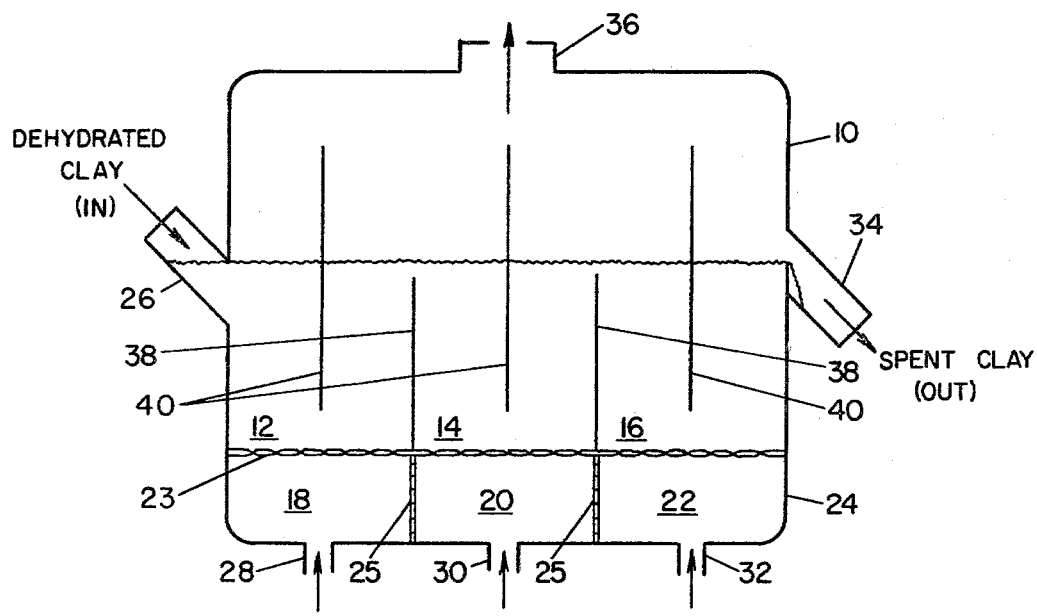
FIG. 1 is a cross-sectional view through a chlorination reactor having multiple horizontal stages in it with a separate gas distribution chamber for each stage to permit independent control of the gaseous mixture fed into each stage.

FIG. 1 illustrates a horizontally staged reactor 10 constructed in accordance with this invention having three fluidized bed sections 12, 14, 16 and three gas distribution plenum chambers 18, 20, 22 with a gas permeable plate 23 between the fluidized bed sections and the plenum chambers. The plenum chambers 18, 20, 22 are separated by gas impermeable walls 25. The number of bed sections and gas distribution chambers may vary depending on the reactor design, reactant materials and desired results. The reactor 10 comprises a metal shell 24 appropriately insulated to minimize heat loss and lined with materials which are resistant to attack by gaseous chlorine and the other reactants. The reactor has an inlet 26 for dehydrated clay and possibly a solid reducing agent if desired, inlets 28, 30, 32 for the gaseous chlorinating and reducing agents, an outlet 34 for the spent clay, and an outlet 36 for effluent gases. The fluidized bed sections 12, 14, 16 in the reactor are separated by vertical divider plates 38 and preferably have baffle plates 40 in each section to force the clay to follow a circuitous path through the reactor.

In accordance with this invention, each plenum chamber 18, 20, 22 has its own gas inlet 28, 30, 32 so the proportions of the gases fed into such chamber can be individually controlled. This permits adjusting the relative proportions of silicon tetrachloride and chlorine fed to each stage of the reactor and also allows for the use of different chlorine feed rates (or equivalently, gas velocities) to be used in each stage of the reactor as a means of adjusting the gas-solid contact time according to the reactivity of the solids in that stage.

The utility of being able to vary the ratio of chlorine to silicon tetrachloride fed to each reactor stage arises from the fact that the proportions of aluminum chloride and silicon tetrachloride produced vary with the extent of the chlorination process (for either solid carbon or carbon monoxide as the reducing agent). For example, it has been found that the proportions of aluminum chloride and silicon tetrachloride produced during chlorination of clay varies substantially as the alumina content is depleted from the clay. The mole ratio of aluminum chloride to silicon tetrachloride in the effluent gas decreases rapidly as the process reaches its conclusion. It may therefore be desirable to provide a higher concentration of silicon tetrachloride as chlorination nears completion to avoid net silicon chlorination.

Comparison of the concentrations of silicon tetrachloride fed to the reactor using silicon tetrachloride recycle (at constant silicon tetrachloride feed rates) with the silicon tetrachloride concentration in the effluent gas from the reactor confirms the variation in the concentration of silicon chloride needed to avoid silicon chlorination at each stage of the reaction. In the early stages of a chlorination reaction, the silicon tetrachloride concentration in the feed gas is more than the concentration in the effluent gas indicating reaction of silicon tetrachloride with alumina to make aluminum chloride. Late in the run, the situation is reversed. Thus, a higher ratio of silicon tetrachloride to chlorine may be desirable in the later stages of the reaction process to avoid net chlorination of silicon.

Another approach to avoiding net silicon tetrachloride production from the overall reactor system would be to feed relatively greater amounts of silicon tetrachloride early in the reaction in order to convert it to aluminum chloride. The present invention makes it possible to operate the chlorination process at maximum efficiency by independently adjusting the proportions of chlorine and silicon tetrachloride in the various stages of the reaction process.

To illustrate the advantage of horizontally staging a reactor or reactors in accordance with this invention, kaolin clay was chlorinated and the mole ratio of $AlCl_3$ to $SiCl_4$ was measured as a function of chlorination time. In the chlorination process, 0.75 mole of $COCl_2$ per hour was used as the chlorinating and reducing agent for an agglomerate of kaolin clay and 5% $KAlCl_4$ at 600° C. and produced the following result:

| | | | MOLE RATIO $AlCl_3/SiCl_4$ FOR CLAY AGGLOMERATES | | | | | | |
|---|---|---|---|---|---|---|---|---|---|
| | | | Mole Ratio $AlCl_3/SiCl_4$ vs. Chlorination Time (Min) | | | | | | |
| Sample No. | Clay Roast Conditions | Agglomerate Size Range (mm) | 15 | 30 | 45 | 60 | 75 | 90 | 105 | 120 |
| 1. | 30 min at | 0.595/ | 5.8 | 5.7 | 2.0 | 1.1 | 0.9 | 1.4 | 12.1 | 5.1 |

-continued

MOLE RATIO AlCl₃/SiCl₄ FOR CLAY AGGLOMERATES

| Sample No. | Clay Roast Conditions | Agglomerate Size Range (mm) | Mole Ratio AlCl$_3$/SiCl$_4$ vs. Chlorination Time (Min) | | | | | | | |
|---|---|---|---|---|---|---|---|---|---|---|
| | | | 15 | 30 | 45 | 60 | 75 | 90 | 105 | 120 |
| 2. | 30 min at 700° C. | 0.297 0.595/ | 5.7 | 12.3 | 12.8 | 14.2 | 10.6 | 5.1 | 0.4 | 0.5 |
| | 800° C. | 0.297 | | | | | | | | |
| 3. | 30 min at 850° C. | 0.595/ 0.297 | 5.5 | 3.6 | — | 2.2 | 2.0 | 0.5 | — | 0.6 |
| 4. | 15 min at 850° C. | 0.595/ 0.297 | 40.2 | 54.4 | 17.3 | 10.6 | 8.0 | — | 0.0 | 0.0 |
| 5. | 15 min at 900° C. | 0.595/ 0.297 | — | 11.3 | 33.0 | 19.3 | 3.6 | — | 1.5 | 1.2 |
| 6. | 30 min at 900° C. | 0.595/ 0.297 | 3.8 | 4.6 | 7.1 | 5.2 | 1.5 | 1.5 | 1.0 | 1.8 |
| 7. | 30 min at 950° C. | 0.595/ 0.297 | 1.4 | 1.4 | 1.1 | 1.3 | 1.5 | 0.9 | 1.0 | 1.1 |
| 8. | 30 min at 1000° C. | 0.595/ 0.297 | 1.7 | 1.7 | 2.0 | 3.1 | 1.5 | 1.4 | 1.2 | 1.1 |
| 9. | 30 min at 800° C. | 4.8/3.4 | 1.7 | 1.2 | 1.5 | 1.9 | 1.7 | 2.0 | 1.5 | 1.5 |
| 10. | 30 min at 800° C. | 2.4/1.7 | 11.4 | 3.4 | 2.8 | 1.9 | 1.2 | 1.4 | 1.4 | 1.2 |
| 11. | 30 min at 800° C. | 0.6/0.3 | 5.7 | 12.3 | 12.8 | 14.2 | 10.6 | 5.1 | 0.4 | 0.5 |
| 12. | 30 min at 800° C. | 0.3/0.21 | — | 26.6 | 18.9 | 19.0 | 10.3 | 2.4 | 1.8 | 1.5 |
| 13. | 30 min at 800° C. | 0.15/0.10 | 12.5 | 12.6 | 9.8 | 8.2 | 3.5 | 2.0 | 1.5 | 1.6 |

Samples Nos. 2, 4, 11, 12 and 13 produced the best results due to selection of proper parameters for roasting of the clay and agglomerate size. Those samples show that the production of AlCl$_3$ is substantially independent of aluminum depletion in the clay until near the end of the chlorination process when the clay is nearly depleted of aluminum. Consequently, it is not necessary or desirable to provide countercurrent flow of clay and gases through a reactor with the fresh clay contacted by substantially spent gas and the almost depleted clay contacted by the richest gas as in a vertically staged reactor. Instead, it is desirable to provide horizontal stages in accordance with this invention in which the gas mixtures and residence times of the clay can be controlled and adjusted depending on the specifics of the reaction in each stage. For example, the use of a plurality of horizontal stages will help ensure that the particles of clay will have more equal residence times in the reaction in process. Some particles will sometimes move through one stage much more quickly than other particles, but the residence times for the particles will average out fairly equally when two or more stages are used. The employment of several horizontal stages having separate gas plenums also provides the desired flexibility for fine tuning of the system for highest efficiency. It is therefore seen that horizontally staged reactors of this invention are particularly well suited for chlorination of clay because such reactors permit adjustment of the proportions of chlorinating agent from stage to stage as chlorination progresses toward completion.

Horizontally staged reactors of this invention also avoid the problems inherent in countercurrent flow of hot gases and solids through vertically stacked or staged reactors. In vertically staged reactors fluidizing grids which separate the stages may be corroded by the hot gases and may also become plugged by the solids entrained in such gases. In contrast, a horizontally staged reactor of this invention is not plagued by such problems because the gases do not flow from stage to stage through the reactor. The grids in a reactor of this invention are therefore not exposed to hot gases with solid particles entrained therein so as to corrode and plug the grids.

Figure 2:
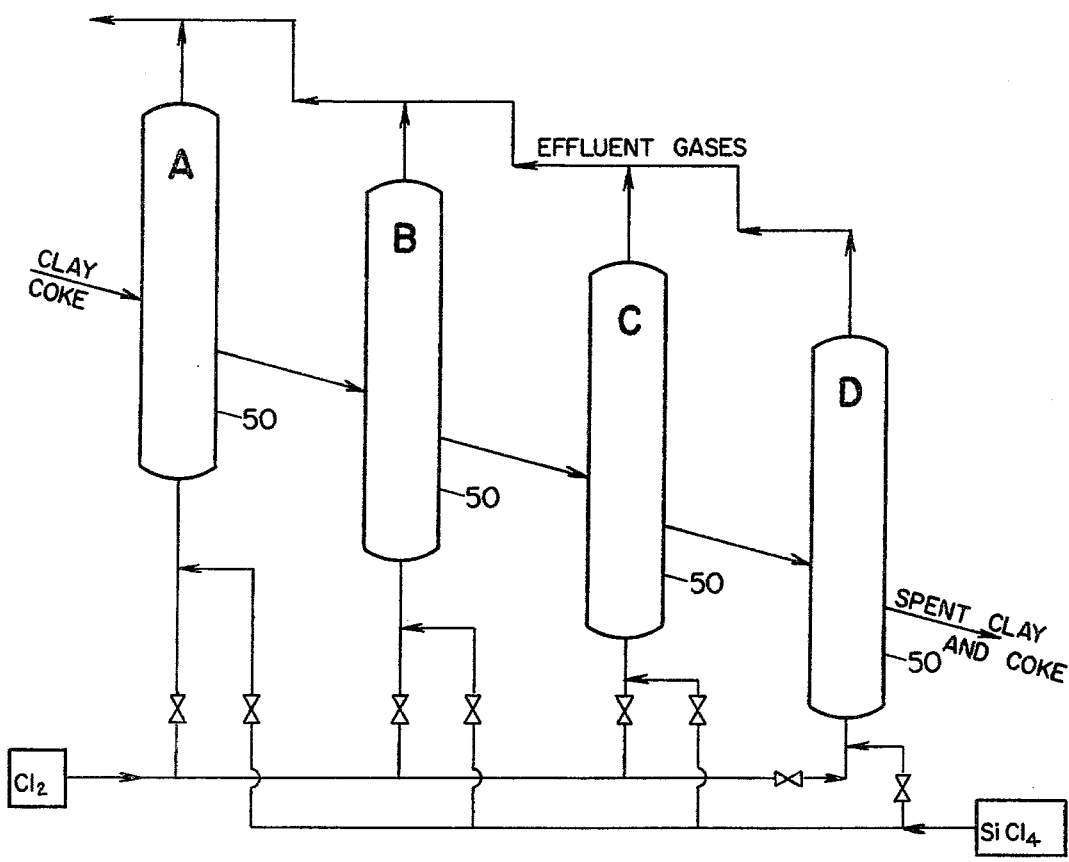
FIG. 2 is a flow diagram of an alternative embodiment of this invention in which a separate container or reactor is provided for each stage of the process and the proportions of feed gases can be independently regulated for each reactor.

FIG. 2 shows another embodiment of this invention in which a plurality of separate reactor containers A, B, C and D are employed. In this embodiment, each reactor may have its own heat source such as a resistance heater for heating the reactants to the desired temperature. They may also include cooling equipment for removal of the exothermic heat of reaction from the gases as they are about to or have just emerged from reactors. Clay and petroleum coke are preferably preheated and fed into reactor A and then fed successively to reactors B, C and D for complete chlorination of the clay. The effluent gases from the reactors are collected and aluminum chloride and silicon tetrachloride separated from such gases. Phosgene may also be recovered from the effluent gases. All of the silicon tetrachloride is preferably recycled into the reactors and chlorine added to it to chlorinate the clay. Carbon monoxide can also be added to the feed gases to supplement the coke as a reducing agent. Since the reactors each have their own gas inlets, the proportions of gases fed to each reactor can be separately and independently varied without regard for what happened in the previous stage of the reaction process to maximize efficiency and recovery of aluminum chloride from the overall process. This embodiment also makes it possible to separately measure the proportions of aluminum chloride and silicon tetrachloride in the effluent gases from each reactor. This permits analysis of the reaction in each reactor and adjustment of the process for optimum efficiency.

It is therefore seen that an improved method and reactor or reactors are provided which permit adjustment of the chlorination process for maximum efficiency and maximum recovery of aluminum chloride. Two embodiments of the invention have been selected for purposes of illustration and explanation, but it will be appreciated by those skilled in the art that numerous modifications may be made in such embodiments without departing from the scope of the invention.

What is claimed is:

1. A process for producing aluminum chloride from clay containing aluminum and silicon by chlorinating the clay at a temperature of about 550°–650° C. for a period of about 1½ to 2½ hours in the presence of an alkali metal compound as a catalyst, which comprises:

contacting the clay with a reducing agent and a gaseous chlorinating agent in a first stage to chlorinate a part of the aluminum in the clay, transferring the clay from the first stage to at least one additional stage and again contacting it with a reducing agent and a gaseous chlorinating agent in each such stage, collecting the effluent gases from each stage and separating aluminum chloride and silicon tetrachloride from such gases, recycling silicon tetrachloride which is separated from the effluent gases back into each stage for contacting the clay, and providing separate feed of silicon tetrachloride and chlorinating agent to each stage of the process and regulating the relative proportions of silicon tetrachloride and chlorinating agent in each feed to maximize production of aluminum chloride and minimize chlorination of silicon in the clay.

2. A process as set forth in claim 1 in which the reducing agent is solid carbon which is mixed with the clay and transferred from stage to stage with the clay.

3. A process as set forth in claim 1 in which the reducing agent is a gas and is mixed with the gaseous chlorinating agent and silicon tetrachloride which is fed into each stage.

4. A process as set forth in claim 1 in which the clay is fluidized in each stage of the reaction process by the gaseous agents flowing through the clay.

5. A process as set forth in claim 1 which includes analyzing the effluent gases from each stage to determine optimum proportions of the gases fed into each stage.

6. A process as set forth in claim 1 which includes at least three stages.

7. A process as set forth in claim 1 in which petroleum coke is used as a reducing agent.

8. A process as set forth in claim 1 which uses a separate vessel for each stage.

* * * * *